_United States Patent_ [19]

Tokas

[11] 4,252,912

[45] Feb. 24, 1981

[54] PROCESS FOR POLYMERIZING TERPOLYMER POLYBLENDS HAVING LOW SURFACE GLOSS

[75] Inventor: Edward F. Tokas, Kirkwood, Mo.

[73] Assignee: Monsanto Company, St. Louis, Mo.

[21] Appl. No.: 139,368

[22] Filed: Apr. 11, 1980

[51] Int. Cl.³ .............................................. C08L 55/02
[52] U.S. Cl. ........................................ 525/83; 525/76; 525/84; 525/243; 525/292; 525/315; 525/316
[58] Field of Search .................... 525/316, 83, 84, 76, 525/292

[56] References Cited

U.S. PATENT DOCUMENTS

| | | | |
|---|---|---|---|
| 3,509,237 | 4/1970 | Aubrey | 525/83 |
| 3,557,254 | 1/1971 | Bauer et al. | 525/316 |
| 3,700,755 | 10/1972 | Yamaguchi et al. | 525/316 |
| 3,991,136 | 11/1976 | Dalton et al. | 525/83 |
| 4,154,715 | 5/1979 | Kruse | 525/316 |

_Primary Examiner_—Carman J. Seccuro
_Attorney, Agent, or Firm_—Joseph S. Nelson; William J. Farrington; Edward P. Grattan

[57] ABSTRACT

This invention relates to a process for preparing terpolymer polyblends having low gloss in extruded profiles wherein rubber particles contained in an aqueous latex are grafted with alkenyl aromatic, alkenyl nitrile and conjugated diolefin monomers to form a grafted rubber phase dispersed in a matrix phase of said monomers, at least a portion of said rubber particles becoming associated with said terpolymers as a gel fraction in said polyblend reducing the gloss of formed polyblend articles. The invention also relates to a composition prepared by said process.

24 Claims, No Drawings

PROCESS FOR POLYMERIZING TERPOLYMER POLYBLENDS HAVING LOW SURFACE GLOSS

BACKGROUND OF THE INVENTION

Prior art processes for ABS polyblends have generally grafted diene rubber particles contained in aqueous emulsion with alkenyl aromatic and alkenyl nitrile monomers to form grafted rubber phase particles dispersed in a matrix phase of said monomers.

The rubber particle size in such rubber emulsions ranges generally from about 0.01 to 0.50 microns which will toughen the matrix phase if incorporated in relatively high concentrations, i.e., 10 to 25% by weight.

The surface gloss of such polyblends is high, as extruded into profiles or molded into articles, because the particle size is too small to disturb the surfaces of the article.

U.S. Pat. No. 3,509,237 discloses that the toughness of ABS polyblends can be improved by adding large particles of grafted rubber, i.e., in the range of about 1 to 2.5 microns to ABS polyblends having rubber particles ranging from 0.01 to 0.50 microns.

It was noted that the large particles lowered gloss and no more than about 3 to 30% of large particles could be used to improve toughness and yet maintain reasonable gloss. Gloss as measured by the well known Hunter Gloss Test could be reduced from about 90 to about 60 using up to about 50% large particles.

Recent commercial requirements for extruded sheet material in formed articles such as housings for appliances, luggage and automotive require that the polyblend have lower gloss to provide a deeper color appearance to formed articles.

The use of larger rubber particles, as disclosed above, is not feasible because gloss cannot be lowered to gloss levels of about 10 to 20 without using all large rubber particles which lowers possible rubber concentrations and toughness.

The bimodal particle size systems of small and large particles then cannot be used to optimize low gloss. These systems also present the problem of preparing two different grafted rubber particle sizes and blending as a separate batch operation increasing costs and lower efficiencies of production.

It has now been discovered that small rubber particles can be grafted with alkenyl aromatic and alkenyl nitrile monomers formulations containing 1 to 15% by weight of conjugated diolefin monomers while forming terpolymers of said monomers having said grafted rubber particles dispersed therein and also a macrogel fraction of larger particles having a largest dimension greater than 1 micron and ranging from 1 to 50 microns or larger preferably 5 to 20 microns. The large particles as observed in electron micro photographs appear as crosslinked or associated masses (gels) of rubber particles and terpolymers or macrogel particles as contrasted to the individual rubber particles which are crosslinked small microgels and appear as individual particles.

The diolefin monomer provides the graft terpolymer and the matrix terpolymer with residual unsaturation that leads to crosslinking at least a portion of the matrix polymer and the grafted rubber into gel fractions in the polyblend that become dispersed as domains of macrogel or large gels which lower the gloss of the formed polyblend article.

SUMMARY OF THE INVENTION

This invention relates to a process for preparing terpolymer polyblends having low surface gloss, comprising the steps:

A. charging an aqueous latex having diene rubber particles dispersed therein to a reaction zone, B. mixing a monomer formulation of alkenyl aromatic, alkenyl nitrile and conjugated diolefin monomers with said latex, said diolefin monomer being present in an amount of about 1 to 15% by weight of said monomer formulation, C. polymerizing said monomers in the presence of said latex such that said rubber particles become grafted with at least a portion of said monomers while said monomers form a matrix terpolymer phase of said monomers, and D. separating said matrix terpolymer phase having said grafted rubber particles dispersed therein from said latex forming said terpolymer polyblend, at least a portion of said grafted rubber particles and said terpolymer becoming associated as a marcrogel fraction dispersed in said polyblend during steps (C) and (D), said polyblend having low surface gloss in formed articles.

The process also relates to a terpolymer polyblend composition comprising:

A. a matrix phase terpolymer of alkenyl aromatic, alkenyl nitrile and conjugated diolefin monomers, B. a diene rubber phase grafted with said monomers as graft terpolymer and dispersed in said matrix phase as rubber particles having an average particle size of about 0.01 to 0.50 microns, and C. a macrogel phase of at least a portion of said terpolymer and said grafted rubber particles forming domains having a largest dimension of greater than 1 micron and dispersed in said polyblend in an amount sufficient to lower the surface gloss of said polyblend as a formed article, said matrix and graft terpolymers having present about 1 to 15% by weight of said conjugated diolefin monomer.

PREFERRED EMBODIMENTS

The monomer formulation comprises, at least principally, a monoalkenylaromatic monomer, a ethylenically unsaturated nitrile monomer and a conjugated diolefin monomer. The monoalkenylaromatic monomer comprises at least one monomer of the formula:

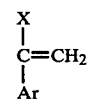

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g., alpha-methylvinyl toluene, etc.; ring-substitute alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc. If so desired, mixtures of such monovinylidene aromatic monomers may be employed.

Exemplary of the unsaturated alkenyl nitriles which may be used in the interpolymers are acrylonitrile, methacrylonitrile, ethacrylonitrile and mixtures thereof.

Exemplary of the conjugated diolefin monomers which may be used are 1,3 conjugated dienes such as butadiene, neoprene, chloroprene, pentadiene or other conjugated dienes of the diene series of hydrocarbons. The diene monomer is present in said monomer formulation in an amount of about 1 to 15% by weight.

The alkenyl aromatic and alkenyl nitrile monomers are present in the monomer formulation in an amount of about 85 to 99% by weight wherein the weight ratio of alkenyl aromatic to alkenyl nitrile is about 85:15 to 60:40 respectively.

Water soluble catalysts that can be used are the alkali metal peroxides, persulfates, perborates, peracetates and percarbonates, preferably potassium persulfate and hydrogen peroxide. Such water soluble catalysts may be activated with reducing agents to form conventional redox systems. Here, the preferred reducing agent can be sodium bisulfite or salts of ferrous ions or reduced transitional metals such as cobalt, nickel and copper. A preferred redox system is made up of the ion couple of $Fe++/S_2O_8--/HSO_3-$.

The catalyst is generally included within the range of 0.001 to 3.0 percent by weight and preferably on the order of 0.005 to 1.0 percent by weight of the polymerizable monomers depending primarily upon the monomer present.

As is well known, it is often desirable to incorporate molecular weight regulators such as mercaptans, halides and terpenes in relatively small percentages by weight, on the order of 0.001 to 1.0 percent by weight of the polymerizable material. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

THE DIENE RUBBER

The preferred rubbers are diene rubbers, including mixtures of diene rubbers, i.e., any rubbery polymer (a rubbery polymer having a second order transition temperature not higher than 0° centigrade, preferably not higher than −20° centigrade, as determined by ASTM Test D-746-52T) of one or more of the conjugated, 1,3-dienes, e.g., butadiene, isoprene, 2-chloro-1,3 butadiene, 1-chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tertbutyl styrene, etc.; an alphamethylstyrene, alphaethylstyrene, alpha-methyl-p-methyl styrene, etc.; vinyl naphthalene, etc.); arhalo monovinylidene aromatic hydrocarbon (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g., ethylene, propylene, etc.); pyridines; vinyl esters (e.g. vinyl acetate, vinyl stearate, etc.); vinyl and vinylidene halides (e.g. the vinyl and vinylidene chlorides and vinylidene chlorides and bromides, etc.); and the like.

Another preferred group of rubbers are those consisting essentially of 75 to 100 percent by weight of butadiene and/or isoprene and up to 25 percent by weight of a monomer selected from the group consisting of monovinylidene aromatic hydrocarbons (e.g. styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene. The diene rubber may contain up to about 2% of a crosslinking agent based on the weight of the rubber monomer or monomers. The crosslinking agent can be of any of the agents conventionally employed for crosslinking diene rubbers, e.g., divinylbenzene, diallyl maleate, diallyl furmarate, diallyl adipate, allyl acrylate, allyl methacrylate, diacrylates and dimethacrylates of polyhydric alcohols, e.g., ethylene glycol dimethacrylate, etc.

EMULSION POLYMERIZATION PROCESS

In the emulsion polymerization grafting process, the monomers and rubber substrate are emulsified in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate and other sodium soaps. Generally, the emulsifying agent is provided in amounts of from about 0.1 to 15 parts by weight per 100 parts by weight of the monomers and water is provided in an amount of from about 1 to 4 parts per part of monomers and even in larger ratios where greater dilution is desirable, all as those skilled in the art appreciate.

If desired, an aqueous latex formed in the emulsion polymerization of the rubber substrate may provide the aqueous solution onto which the monomers are grafted, with or without the addition of further emulsifying agents, water and the like.

Typical emulsion polymerization conditions involve temperatures in the range of from about 20° to 100° C. with agitation and preferably an inert atmosphere. Pressures of from about 1 to 100 pounds per square inch may be employed and monomers and/or additional catalysts may be added incrementally or continuously over a portion of the reaction cycle. Polymerization is preferably continued until substantially all, that is more than 90%, of the monomers have polymerized. The remaining monomers and other volatile components are then distilled away from the latex, preferably, which is then ready for further treatment.

Particle size of the emulsion latex graft particles may be varied by seeding, emulsifying agent concentration, agitation, rubber size variation through agglomeration prior to grafting, coagulation techniques, etc. Preferred agglomeration procedures are provided by Dalton's U.S. Pat. No. 3,558,541 and U.S. Pat. No. 3,551,370.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally, smaller graft polymer particles will tolerate a higher superstrate/substrate ratio than larger size particles.

The particle size of the emulsion rubber graft copolymer has a significant effect upon the gloss and physical properties of the product produced by the processes of this invention. Typically, the particle size of the graft copolymers used in the practice of the present invention may be varied from as little as about 0.01 microns to as large as about 1.0 microns and preferably from about 0.05 to 0.80 microns depending upon the ultimate properties desired for a given product. A most preferred rubber graft copolymer for use in the practice of this invention are graft copolymers having a weight average particle size of from about 0.2 to 0.7 microns for the grafted rubber.

For emulsion polymerization processes, the rubber desirably has a significant degree of crosslinking. With respect to the graft copolymers, at least some degree of crosslinking is inherent during the graft polymerization process and this desirably may be augmented through the addition of crosslinking agents or control of the polymerization conditions.

The dispersed rubber phase increases the toughness of the ABS type polymeric polyblend as measured by its Izod impact strength by Test ASTM D-256-56. It has been found that the impact strength of polyblends increase with the weight percent rubber dispersed in the polyblend as used in the present invention. The impact strength is also determined by the size of the dispersed rubber particles, with the larger particles providing higher impact strength measured as a weight average particle size diameter with a photosedimentometer by the published procedure of Graves, M. J., et. al., "Size Analysis of Subsieve Powders Using a Centrifugal Photosedimentometer," British Chemical Engineering 9:742–744 (1964). A Model 3000 Particle Size Analyzer from Martin Sweets Co., 3131 West Market St., Louisville, Ky. was used.

The product of the emulsion grafting process is the diene rubber particles grafted with a portion of the monomers charged to the rubber latex. In addition, the monomers form a terpolymer of said monomers as a matrix phase. The grafted monomers form a superstrate on the diene rubber particles as a substrate when the monomers are grafted with water soluble catalysts.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

Such surface or superstrate grafting causes the rubber particle to disperse readily in the matrix phase terpolymers when melt colloided during extrusion. In addition, the superstrate provides a compatible interface with the matrix phase to increase toughness or impact strength. As taught supra the larger the amount of the rubber moiety in a polyblend the tougher the polyblend with ABS polyblends containing 2 to 50% of said rubber moiety depending on toughness desired.

The aqueous latex charged in step (A) contains about 20 to 60% of emulsified diene rubber particles have a rubber particle size of about 0.01 to 0.5 microns. The matrix polymer phase formed during polymerization has a molecular weight of about 50,000 to 500,000. The diene rubber particles after grafting and the matrix polymer formed can be separated from the aqueous emulsion by coagulation with inorganic salts such as $MgSO_4$, $Al_2(SO_4)_3$ or acids such as acetic, hydrochloric or sulfuric used in amounts sufficient to stoichometrically neutralize the emulsify agents and cause coagulation. The grafted rubber particles and the matrix polymer particles will form a coagulated crumb which separate from the aqueous phase of the latex and can be easily removed by filtration, decanting or centrifuging followed by washing and drying. As disclosed, the matrix polymer phase formed during emulsion polymerization cocoagulates with the rubber particles as part of the coagulate forming an intimate mixture as a new polyblend of grafted rubber particles and matrix polymer particles. The melt extrusion of such blends can further colloidally disperse the grafted rubber particles and macrogels in the matrix phase polymer as an ABS polyblend.

As indicated supra, the terpolymer and the grafted rubber particles do crosslink during the polymerization and/or separation steps forming large macrogels which are also dispersed in the polyblend.

Another suitable method for separating said grafted rubber particles and said matrix phase from said latex is to mix additional monomer formulation into said latex after grafting in amounts sufficient to extract said grafted rubber particles and said matrix polymer particles into said additional monomer formulation as a liquid monomer phase and removing said liquid monomer phase from the aqueous phase of said latex by decanting or centrifugation.

The ratio of the additional monomer used for extraction to the weight of grafted rubber particles and matrix phase polymer in the latex can be about 2 to 1 to 5 to 1 by weight. The higher the amount of monomers used the less viscous is the liquid monomer phase formed and the more readily it separates from the aqueous phase of the latex. Improved dewatering of the liquid monomer phase can be carried out by adding inorganic salts or acids to the latex to deemulsify the grafted rubber particles and matrix phase particles so that water is not occluded with the particles as extracted into the monomer phase. Said liquid monomer phase can be mass polymerized thermally or with said monomer-soluble catalysts at temperatures of 100° to 180° C. to completion or to conversions of 50 to 90% followed by conventional devolatilization of the residual monomers providing the new polyblend with additional matrix phase polymers. Such mass polymerization can be carried out in stirred reactors, in plug flow towers or tubular reactors. U.S. Pat. No. 3,751,010 discloses a stirred horizontal, evaporatively cooled reactor which is suitable for the mass polymerization of said liquid monomer phase to form such polyblends.

The following examples are illustrative of the present process and are not meant to limit the scope or spirit of the invention.

EXAMPLE 1

To a 250.0 parts of a latex of butadiene/acrylonitrile copolymer (93:7) containing 50.0 percent solids and with a gel content of about 75% approximately 1.0 part of rubber reserve soap as an emulsifier were added 70.0 parts water, 1.0 part rubber reserve soap and 1.0 part potassium persulfate.

This emulsion was heated to 65° centigrade with stirring and then there were added thereto over a period of about six hours 140.0 parts styrene, 60.0 parts acrylonitrile and 3.0 parts of terpinolene. The emulsion was held at temperature for one hour thereafter with stirring, cooled, coagulated by the addition of magnesium sulfate and the coagulant was then washed and dried. The resulting graft copolymer has a superstrate to substrate ratio of about 0.9:1.0 and a rubber particle size of about 0.25 micron.

Electron micrographs of the graft copolymer showed the rubber particles to have essentially only a superstrate graft coating of polymers of said monomer formulation with said grafted particles dispersed in said matrix phase as microgels having a size of about 0.25 microns. There was no visual evidence of large macrogel domains of crosslinked and agglomerated rubber particles associated with crosslinked matrix polymers.

EXAMPLES 2-4

Example 1 was repeated using butadiene monomer in the monomer formulation as shown below in Table I.

TABLE I

| Ex. No. (1) | Butadiene Monomer PPHM (2) | Elongation Failure Mode | Elongation to Fail % | Multi-axial Impact Strength (3) | Gloss (4) |
|---|---|---|---|---|---|
| 1 | 0 | Brittle | 11 | 15 | 96 |
| 2 | 2 | Ductile | 19 | 18 | 35 |
| 3 | 6 | Ductile | 22 | 26 | 12 |
| 4 | 12 | Ductile | 34 | 29 | 6 |

(1) Polyblend colloid with styrene/acrylonitrile (70/30) polymer giving polyblend 22% rubber moiety and extruded to 30 mil sheet for testing.
(2) PPHM - parts per hundred of monomer or parts of butadiene per hundred parts of monomer.
(3) Inch/pounds (30 mil sheet) IDI ½ inch dart.
(4) Sheet gloss (Hunter Gloss Meter 60° head)

It is evident from the data that the incorporation of butadiene monomer in the monomer formulation, unexpectedly lowers the gloss of formed articles of the polyblend and increases overall toughness providing higher impact strength, elongation to fail and ductile failure.

What is claimed is:

1. A process for preparing terpolymer polyblends having low surface gloss, comprising the steps:
   A. charging an aqueous latex having diene rubber particles dispersed therein to a reaction zone,
   B. mixing a monomer formulation of alkenyl aromatic, alkenyl nitrile and conjugated diolefin monomers with said latex, said diolefin monomer being present in an amount of about 1 to 15% by weight of said monomer formulation,
   C. polymerizing said monomers in the presence of said latex such that said rubber particles become grafted with at least a portion of said monomers while said monomers form a matrix terpolymer phase of said monomers, and
   D. separating said matrix terpolymer phase having said grafted rubber particles dispersed therein from said latex forming said terpolymer polyblend, at least a portion of said grafted rubber particles and said terpolymer becoming associated as a macrogel fraction dispersed in said polyblend during steps (C) and (D), said polyblend having low surface gloss in formed articles.

2. A process of claim 1 wherein said diene rubber is polybutadiene, butadiene copolymers of butadiene-styrene, butadiene-acrylonitrile, polychloroprene, polyisoprene or mixtures thereof.

3. A process of claim 1 wherein said alkenyl aromatic monomer is styrene, alpha-methyl styrene, chlorostyrene, bromostyrene, aralkyl styrene and arhaloalkyl styrene or mixtures thereof.

4. A process of claim 1 wherein said alkenyl nitrile monomer is acrylonitrile, metha-acrylonitrile, ethyl-acrylonitrile or mixtures thereof.

5. A process of claim 1 wherein said separation of step (D) is carried out by the coagulation of said aqueous latex followed by filtering, washing and drying said polyblend of said grafted diene rubber and said matrix polymer phases.

6. A process of claim 1 wherein said diene rubber moiety is present in said polyblend in an amount of about 2 to 50% by weight based on said polyblend.

7. A process of claim 1 wherein said latex has present said diene rubber particles in an amount of about 20 to 60% by weight based on said latex.

8. A process of claim 1 wherein the weight ratio of alkenyl aromatic to alkenyl nitrile monomers in said monomer formulation is about 85:15 to 60:40.

9. A process of claim 1 wherein said conjugated diolefin monomer is selected from the group consisting of butadiene, chloroprene, isoprene, pentadiene or other 1,3 diolefins and mixtures thereof.

10. A process of claim 1 wherein said polymerization in step (C) is carried out at 20° to 100° C., at 0.7 to 7 atms. of pressure with water soluble catalysts.

11. A process of claim 1 wherein said water soluble catalysts are selected from the group consisting of alkali metal percarbonates, persulfates, perborates, peracetates and hydrogen peroxide or mixtures thereof.

12. A process of claim 4 wherein said water soluble catalysts are activated as a redox system.

13. A process of claim 1 wherein said separation of step (D) is carried out by the coagulation of said aqueous latex followed by filtering, washing and drying said ABS polyblend of said grafted diene rubber and said matrix polymer phases forming a macrogel phase in said polyblend.

14. A process of claim 1 wherein said separation is carried out by mixing said latex after step (C) with additional monomer formulation in an amount sufficient to extract said grafted rubber particle phase and said matrix phase into said monomer formulation as a liquid monomer phase followed by removing said liquid monomer phase from an aqueous phase of said latex.

15. A process of claim 14 wherein said liquid monomer phase is mass polymerized forming addition matrix phase polymer in said polyblend.

16. In a process for polymerizing terpolymer polyblends having the steps:
   A. charging an aqueous latex having diene rubber particles dispersed therein to a mixing zone, said diene rubber being selected from the group consisting of polybutadiene, isoprene, chloroprene, copolymers of butadiene/styrene and butadiene/acrylonitrile and mixtures thereof.

B. mixing a monomer formulation consisting essentially of styrene, acrylonitrile and butadiene monomers in said latex, said butadiene being present in amount of about 1 to 15% by weight of said monomer formulation.

C. polymerizing said monomers in the presence of said latex such that said diene rubber particles become grafted with at least a portion of said monomers while said monomers form a terpolymer matrix phase of said polymers, D. separating said grafted rubber particles dispersed in said matrix polymer phase from said latex as said terpolymer polyblend, at least a portion of said grafted rubber particles and said terpolymer becoming associated as a gel fraction dispersed in said polyblend during steps (C) and (D).

17. A composition of matter prepared by the process of claim 1.

18. A terpolymer polyblend composition comprising:
A. a matrix phase terpolymer of alkenyl aromatic, alkenyl nitrile and conjugated diolefin monomers,
B. a diene rubber phase grafted with said monomers as graft terpolymer and dispersed in said matrix phase as rubber particles having an average particle size of about 0.01 to 0.50 microns, and
C. a macrogel phase of at least a portion of said terpolymer and said grafted rubber particles forming domains having a largest dimension of greater than 1 micron and dispersed in said polyblend in an amount sufficient to lower the surface gloss of said polyblend as a formed article, said matrix and graft terpolymers having present about 1 to 15% by weight of said conjugated diolefin monomer.

19. A composition of claim 18 wherein said diene rubber is polybutadiene, butadiene copolymers of butadiene-styrene, butadiene-acrylonitrile, polychloroprene, polyisoprene or mixtures thereof.

20. A composition of claim 1 wherein said alkenyl aromatic monomer is styrene, alpha-methyl styrene, chlorostyrene, bromostyrene, aralkyl styrene and ar-haloalkyl styrene or mixtures thereof.

21. A composition of claim 1 wherein said conjugated diolefin monomer is selected from the group consisting of butadiene, chloroprene, isoprene, pentadiene or other 1,3 diolefins and mixtures thereof.

22. A composition of claim 1 wherein said macrogel has a largest dimension of about 1–50 microns and is present in said polyblend in an amount sufficient to lower the surface gloss of a formed article of said polyblend to less than 50.

23. A composition of claim 22 wherein the surface gloss of said formed article is 5 to 50.

24. A composition of claim 1 wherein said polyblend has present a copolymer of said alkenyl aromatic and alkenyl nitrile monomers in an amount of about 1 to 50% by weight of said matrix phase.

* * * * *